May 14, 1929. D. STENHOUSE 1,712,907
TRANSFERRING APPARATUS FOR CONTINUOUSLY ROTATING GLASS FORMING MACHINES
Filed March 9, 1925 2 Sheets-Sheet 1
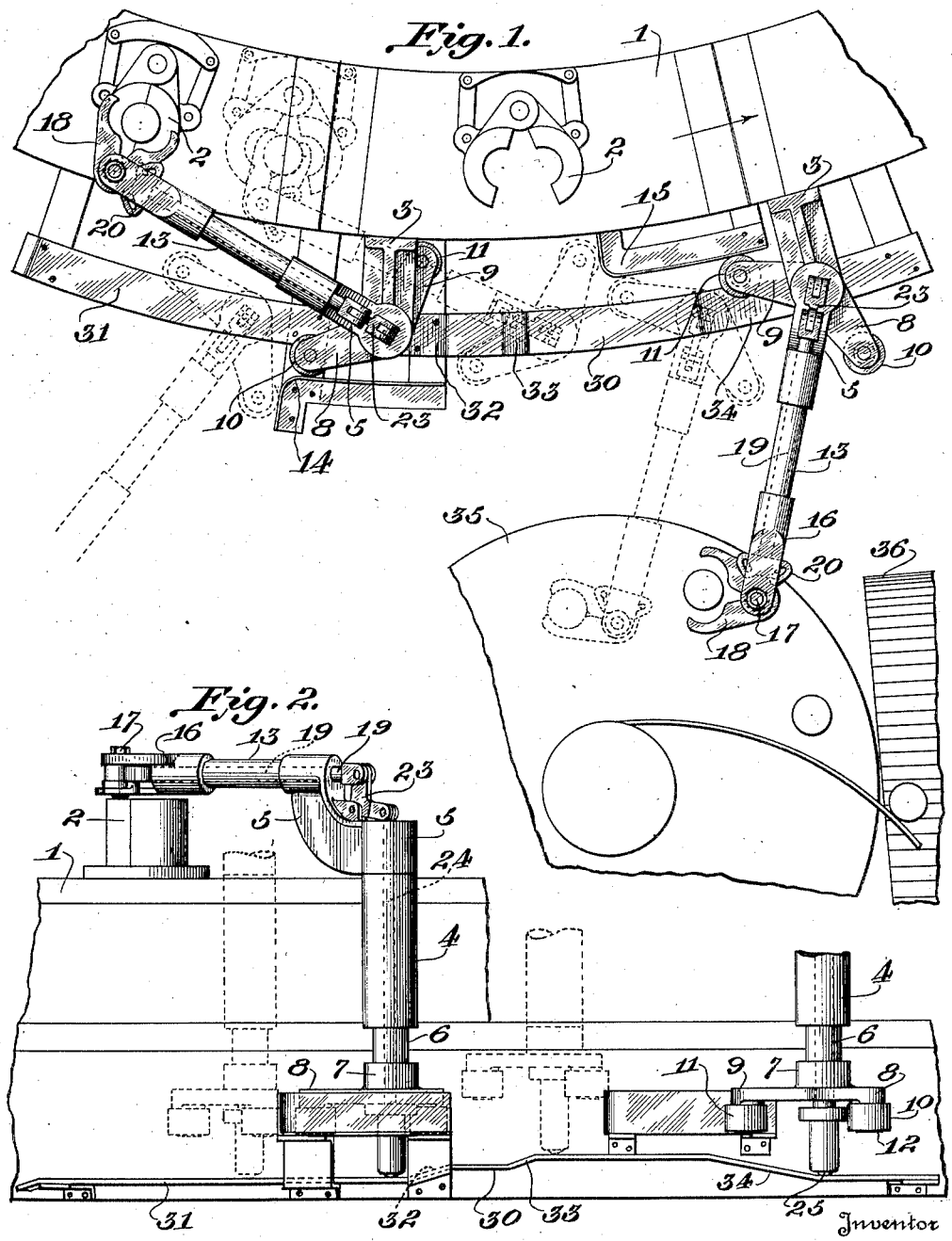
Inventor
David Stenhouse.
By Eccleston & Eccleston
Attorneys

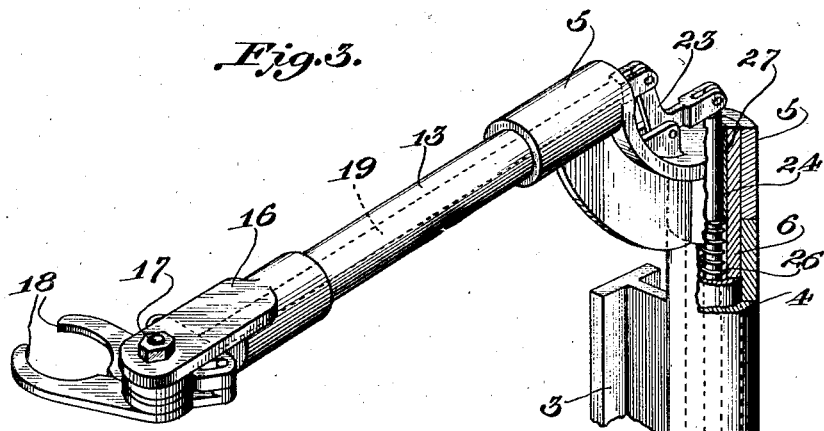
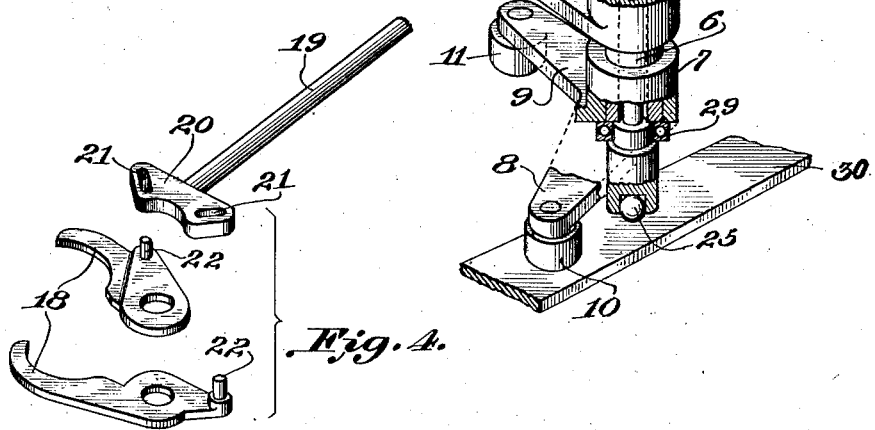

Patented May 14, 1929.

1,712,907

UNITED STATES PATENT OFFICE.

DAVID STENHOUSE, OF WASHINGTON, PENNSYLVANIA, ASSIGNOR TO HAZEL-ATLAS GLASS CO., OF WHEELING, WEST VIRGINIA, A CORPORATION OF WEST VIRGINIA.

TRANSFERRING APPARATUS FOR CONTINUOUSLY-ROTATING GLASS-FORMING MACHINES.

Application filed March 9, 1925. Serial No. 14,239.

The conventional type of glass forming machine consists in part of a series of molds mounted on a table; the table being intermittently rotated to bring each mold successively into proper position relative to the various forming devices. In that type of machine the rotary table is stopped at each station, including the discharging station, and it was comparatively easy to design an apparatus to transfer the glassware from the molds, while momentarily at a standstill, to a lehr, conveyer, or the like, and a number of devices for that purpose have been invented. In more recent years, however, the intermittently rotating machine has been superseded, to some extent by continuously rotating machines. In these machines all the operations of feeding the glass to the molds, and forming the articles, are performed while the table carrying the molds continues to rotate at a constant speed. And the present invention therefore relates to an apparatus for gripping the formed articles and transferring them to a conveyer, table, lehr, or the like, while the mold table continues to revolve.

The construction of the apparatus and the advantages thereof will be clearly understood from the following detailed description when taken in connection with the accompanying drawings; in which, Figure 1 is a fragmentary plan view of a mold table, showing two molds, and two of the transferring devices in various positions in the cycle of operations.

Figure 2 is a fragmentary side elevational view of the apparatus.

Figure 3 is a perspective view of one of the transfer units, parts being in section, and parts being broken away, to more clearly show the construction; and Figure 4 is a detail perspective view of the elements forming the gripping mechanism.

Referring to the drawings more in detail, numeral 1 indicates an ordinary mold table, on which are mounted in the usual manner the desired number of partible molds 2; only two of the molds being shown in the drawings. The table is continuously rotated at a constant speed by any desired mechanism (not shown), and the various operations for forming the glass articles are performed, while the table continues to rotate. The particular apparatus for forming the articles constitutes no part of the present invention, as the novel transferring mechanism disclosed herein is equally well adaptable to all types of forming machines in which the mold table is continuously rotated. The transfer mechanism will now be described; it being understood that there is one complete transfer unit for each mold, and as all of the transfer units are identical in construction, a description of one of them will suffice.

Numeral 3 indicates a bracket which is attached to the vertical face of the mold carrier or table, and attached to or integral with this bracket is a bearing member 4. A swinging bracket is indicated by numeral 5, and as clearly shown in Figure 3 this swinging bracket normally rests on the top of the bearing 4; and integral with the swinging bracket, or attached thereto, is a sleeve 6 which extends all the way through the bearing member 4.

Keyed or otherwise attached to the lower end of the sleeve 6 is a hub 7 carrying the two arms 8 and 9. At the ends of these arms 8 and 9 are rollers 10 and 11 respectively; the rollers being revolvably mounted by means of screw studs 12, or the like.

Extending horizontally from the swinging bracket 5 is a hollow arm 13, and mounted on the end of this hollow arm are the gripping elements, to be hereinafter described. Before describing the grippers, the mechanism for operating them, and the apparatus for raising and lowering the grippers, I will first describe the construction by which the swinging brackets 5 and rods 13 are swung back and forth at intervals.

Rigidly attached to the base plate of the machine are cam tracks 14 and 15, suitably spaced apart, and arranged in the path of the rollers 10 and 11 respectively. The cam track 14 is so placed that as the table revolves the roller 10 carried by arm 8 will contact therewith to swing the bracket 5 and arm 13 inwardly to the first full line position shown in Figure 1, where the grippers are in position to grip the finished article. Upon further rotation of the table the roller 10 will be carried free of the track 14, and the roller 11 carried by the arm 9 will contact with the track 15 and thereby swing the bracket 5 and arm 13 outwardly into position to deposit the article on a conveyor or the like. It is thus seen that each of the arms 13 is swung inwardly and then outwardly as its particular mold passes through the discharging position. The mechanism for gripping the articles, lifting them, and depositing them, will now be described.

Attached to the outer end of the hollow arm 13 is an extension member 16, and pivotally mounted on the extension member, by means of the pin 17, are the grippers 18, 18. Slidably mounted in the hollow arm 13 is a link 19, carrying at its end a cross member 20 provided with slots 21, 21. These slots are engaged by pins 22, 22, carried by the grippers 18, 18, and the slots are so arranged that as the cross member 20 is moved back and forth the grippers will be opened and closed.

A bell-crank lever 23 is mounted on the swinging bracket 5, and one arm of this bell-crank lever is connected to the link 19 which opens and closes the grippers, while the other arm of the bell-crank lever is attached to an operating rod 24 which is mounted for limited vertical sliding movement in the sleeve 6. The operating rod 24 extends entirely through the sleeve 6, and the lower end of the rod is adapted to engage with a cam track, to be hereinafter described. The lower end of the rod 24 is provided with a socket adapted to receive an antifriction ball 25, which is loosely held in the socket in any desired manner, as by knurling over it the lower end of the rod. This ball 25 provides rolling contact with the track as the transfer mechanism travels circumferentially, and also provides pivotal contact with the track when the transfer mechanism is oscillated during its circumferential travel.

The operating rod 24 is normally maintained lowered by means of a coil spring 26, which is under compression between a fixed bushing 27, or a shoulder formed on the tube 6, and a collar 28 on the rod 24. The collar 28 may be screw-threadedly mounted on the rod 24, or it may consist merely of a shoulder formed on the rod. A roller bearing 29 is mounted on the rod 24 below the hub 7, and is adapted to be brought into contact therewith in a manner to appear hereinafter.

A cam track 30 is rigidly attached to the base plate of the apparatus, and is arranged in the path of the lower ends of the rods 24 of the transfer units; the track being clearly shown in Figures 1 and 2. The ball 25 of the rod 24 first travels over a horizontal portion 31, of the track 30, and it then rides up an inclined step 32, which elevates the rod 24 against the pressure of the spring 26, and through the bell-crank lever 23 and link 19 moves the grippers to closed position. This upward movement of the rod 24 has brought the roller bearing 29 into contact with the hub 7, and hence as the rod 24 is further elevated by riding up the second inclined step 33, the entire apparatus is moved upwardly through the bearing 4; the swinging bracket 5 being thus lifted off its normal support 4. By this second upward movement the article to be transferred is lifted clear of the mold bottom, preparatory to the outward swing of the arm 13 toward the conveyer system. The ball 25 now rides along a horizontal section of the track 30 until it reaches a downwardly inclined step 34, by which step the entire transfer apparatus is first lowered by gravity until the swinging bracket 5 contacts with and is supported by the bearing member 4. Upon further circumferential travel of the transfer unit the remainder of the downwardly inclined step 34 permits the rod 24 to be positively lowered by the pressure of the spring 26, and by this further downward movement of the rod the grippers are opened to deposit the transferred article. The ball 25 now passes off the track 30 until in the cycle of operations it again approaches the position where the articles are transferred. Of course the arms 8 and 9 cooperate with the tracks 14 and 15 respectively during the engagement of the ball 25 with the track 30; and all of the operations of gripping the article, lifting it, transferring it, and depositing it, will now be described in their proper sequence.

The specific operation of the particular apparatus illustrated, is as follows:

As hereinbefore stated, the mold carrier or table is rotated continuously at a constant speed; the direction of movement being as indicated by the arrow in Figure 1. The various operations of feeding the glass and forming the articles are performed during the continuous rotation of the table, by any desired apparatus; and when the molds reach the position of the first full line mold at the left of the Figure 1 the article has been formed, but the partible mold has not yet been opened. The position of the transfer unit for that particular mold at that point in its circumferential travel, is shown by broken lines at the left of Figure 1; the unit extending outwardly away from the table. At this point the roller 10 of the arm 8 contacts with the cam track 14, and as the table continues to revolve the arm 13 and the grippers 18 carried thereby are swung inwardly into position to close around the article to be lifted, as clearly shown in the full line position at the left of Figure 1. In this position it is to be particularly noted that the partible mold is still closed. The transfer unit has just reached the first upwardly inclined step 32, and as the rod 24 rides up this step the bell-crank lever 23 will shift the position of the link 19, thereby forcing the grippers to closed position through the engagement of the pins 22 in the slots 21. The article has thus been grasped preparatory to being lifted and transferred; but it is to be particularly noted that the article has been gripped before the mold has been opened, and this is done for a particular purpose. The articles have a tendency to stick to one side or the other of the molds when they are opened, and while this may not occur very frequently, yet as the operation of the continuously rotating machine is comparatively rapid, this temporary disorganization of the unit may continue for several cycles, before the obstruction is removed. It is thus seen that by gripping the ware before the molds are opened the sticking of the articles is positively prevented.

The article having been gripped, as above described, the mold is automatically opened in the ordinary operation of the machine, and as the rotation of the table continues the ball 25 riding on the track reaches the second upwardly inclined step 33. When the ball 25 traveled up the first inclined step 32 the rod 24 was elevated to close the grippers, in the manner described, and that upward movement of the rod brought the roller bearing 29 into contact with the hub 7 on the tube 6. Therefore as the ball 25 travels up the second inclined step 33 the entire transfer unit will be elevated, thereby lifting the article clear of the mold bottom.

Upon further rotation of the table the roller 10 passes free of the track 14, and the roller 11 of arm 9 comes into contact with the track 15, as shown in dotted lines in Figure 1. The engagement of the roller 11 with the track 15 causes the transfer unit to be swung outwardly over a rotating table 35, as shown in Figure 1. While the transfer unit was being swung outwardly the ball 25 was travelling over a horizontal portion of the track 30, but it now reaches the downwardly inclined step 34, and as it rides down this step the entire transfer unit is lowered by gravity until the swinging bracket 5 reaches the bearing member 4, upon which it rests and prevents further downward movement of the transfer unit as a whole. The ball 25 has not yet reached the bottom of the step 34, however, and as the table continues to rotate the ball is positively caused to follow the downwardly inclined track by the pressure exerted by the spring 26 on the rod 24. This further downward movement of the rod 24 operates the bell-crank lever 23 to move the grippers to open position, thereby depositing the transferred article on the rotary table 35, which transports it to an endless conveyer or lehr 36, in a well known manner.

It will be understood, of course, that the conveyers 35 and 36 are merely shown for purposes of illustrating a complete apparatus, for these elements form no part of the present invention.

It is also to be noted that in some forming machines it may not be necessary to lift the article clear of the mold bottom, and in such cases the step 33 for elevating the entire unit as a whole, could be omitted, and the construction could otherwise be simplified.

It is also to be particularly understood that this invention is in no manner limited to the particular construction illustrated and described in detail herein, for the invention relates broadly to a transfer mechanism adapted to use in a continuously rotating forming machine, and I intend to cover such a transfer mechanism in the broadest possible manner.

What I claim as new and desire to cover by Letters Patent is:

1. An apparatus of the character described, including a continuously revolving table, a pair of grippers carried by the table, a vertically reciprocable rod, an operative connection between the grippers and the rod, and a stationary cam track adapted to be engaged by the rod during the rotation of the table.

2. An apparatus of the character described, including a continuously revolving table, a pair of grippers carried by the table, a link operatively connected with the grippers, a vertically reciprocable rod, an operative connection between the link and the rod, and a stationary cam track adapted to be engaged by the rod during the rotation of the table.

3. An apparatus of the character described, including a continuously revolving table, a pair of grippers carried by the table, a link operatively connected with the grippers, a vertically reciprocable rod, a bell-crank lever, one arm of the bell-crank lever connected with the link and the other arm of the bell-crank lever connected with the vertically reciprocable rod, and a stationary cam track adapted to be engaged by the rod during the rotation of the table.

4. An apparatus of the character described, including a continuously revolving table, a pair of grippers carried by the table, a link operatively connected with the grippers, a vertically reciprocable rod, a bell-crank lever, one arm of the bell-crank lever connected with the link and the other arm of the bell-crank lever connected with the vertically reciprocable rod, a spring exerting a downward pressure on the rod, and a stationary cam track adapted to be engaged by the rod during the rotation of the table.

5. An apparatus of the character described, including a continuously revolving table, a horizontally swinging arm mounted on said table, a pair of grippers carried by the swinging arm, a downwardly extending member operatively connected with the swinging arm, two laterally extending arms carried by the downwardly extending member, a cam track adapted to be engaged by one of said laterally extending arms, and another cam track adapted to be engaged by the other of said laterally extending arms.

6. An apparatus of the character described, including a continuously revolving table, a swinging arm carried by the table, a pair of grippers carried by the arm, a link operatively connected with the grippers for opening and closing them, means for operating the link, means for raising the arm, and means for swinging the arm.

7. An apparatus of the character described, including a continuously revolving table, a hollow swinging arm mounted on the table, grippers carried by the arm, a link mounted in said arm and operatively connected with the grippers, means for reciprocating said link to open and close the grippers, means to raise and lower said arm, and means for swinging said arm.

8. An apparatus of the character described, including a continuously revolving table, a bearing member mounted on the table, a swinging bracket normally resting on the bearing member, a pair of grippers carried by the swinging bracket, a tubular member attached to said bracket and extending downwardly through the bearing member, cams for oscillating the tubular member, and means for elevating the tubular member to raise the bracket off the bearing member.

9. An apparatus of the character described, including a continuously revolving table, a bearing member carried by the table, a swinging bracket, grippers carried by the swinging bracket, a link operatively connected with the grippers, a tubular member connected with the bracket and extending downward through the bearing member, a rod operatively connected with the link and extending downwardly through the bearing member, means for raising and lowering the rod, and means for swinging the bracket.

10. An apparatus of the character described, including a continuously revolving table, a bearing member carried by the table, a swinging bracket, grippers carried by the swinging bracket, a link operatively connected with the grippers, a tubular member connected with the bracket and extending downward through the bearing member, a rod operatively connected with the link and extending downwardly through the bearing member, means for raising the rod relative to the tubular member, and means for raising the rod and tubular member bodily.

11. An apparatus of the character described, including a continuously revolving table, a bearing member carried by the table, a swinging bracket, grippers carried by the swinging bracket, a link operatively connected with the grippers, a tubular member connected with the bracket and extending downward through the bearing member, a rod operatively connected with the link and extending downwardly through the bearing member, means for raising the rod relative to the tubular member, and means for oscillating the tubular member.

12. An apparatus of the character described, including a continuously revolving table, a bearing member carried by the table, a swinging bracket, grippers carried by the swinging bracket, a link operatively connected with the grippers, a tubular member connected with the bracket and extending downward through the bearing member, a rod operatively connected with the link and extending downwardly through the bearing member, means for raising the rod relative to the tubular member, means for raising the rod and tubular member bodily, and means for oscillating the rod and tubular member in unison.

13. An apparatus of the character described, including a continuously revolving table, a bearing member carried by the table, a tubular member extending downwardly through the bearing member, a swinging bracket attached to the tubular member and normally supported by the bearing member, a pair of grippers carried by the swinging bracket, a link operatively connected with the grippers, a vertical rod extending through the tubular member and operatively connected with said link, a cam track cooperating with the lower end of said rod, said cam track adapted to raise and lower said rod, and cam tracks cooperating with the tubular member to oscillate the same.

14. An apparatus of the character described, including a continuously revolving table, a bearing member carried by the table, a tubular member extending through the bearing member, a bracket attached to the upper end of the tubular member, grippers carried by the bracket, a link operatively connected with the grippers, a rod operatively connected with said link and extending through said tubular member, means for raising said rod relative to the tubular member until it engages the latter, and means for further raising the rod to lift the tubular member.

15. An apparatus of the character described, including a continuously revolving table, a swinging arm mounted on the table, grippers carried by the swinging arm, a link operatively connected with the grippers, a vertical rod operatively connected with the link, a cam track cooperating with the lower end of the rod to raise and lower the rod, means for oscillating the rod, and an antifriction ball mounted in the lower end of the rod to provide rolling and pivotal contact with the cam track.

16. An apparatus of the character described, including a continuously revolving table, a swinging arm mounted on the table, grippers carried by the swinging arm, a link operatively connected with the grippers, a vertical rod operatively connected with the link, a cam track cooperating with the lower end of said rod for raising the rod, and a spring for lowering the rod.

17. An apparatus of the character described, including a continuously revolving table, a bearing member carried by the table, a tubular member extending through the bearing member, a bracket carried by the tubular member, grippers carried by the bracket, a link operatively connected with the grippers, a rod operatively connected with the link and extending through the tubular member, a cam track for raising the rod relative to the tubular member until it engages the latter, said cam track further raising the rod and tubular member bodily, said cam track then permitting the tubular member and rod to be lowered bodily by gravity, a spring member for positively lowering the rod relative to the tubular member, and means for oscillating the tubular member.

18. An apparatus of the character described, including a continuously revolving table, a bearing member mounted on the table, a tubular member extending through said bearing member, a bracket attached to the upper end of said tubular member, grippers carried by said bracket, a link operatively connected with the grippers, a rod operatively connected with the link and extending downwardly through the tubular member, laterally extending arms carried by the lower end of the tubular member, cam tracks adapted to be engaged by said tubular member, and a cam track adapted to be engaged by the lower end of the rod.

19. An apparatus of the character described, including a continuously revolving table, a bearing member mounted on the table, a tubular member extending through said bearing member, a bracket attached to the upper end of said tubular member, grippers carried by said bracket, a link operatively connected with the grippers, a rod operatively connected with the link and extending downwardly through the tubular member, laterally extending arms carried by the lower end of the tubular member, cam tracks adapted to be engaged by said tubular member, a cam track adapted to be engaged by the lower end of the rod, and a spring exerting downward pressure on said rod.

20. A continuously revolving mold table, an article transfer mechanism mounted on the mold table independently of the molds and adapted to remove formed ware from molds, said transfer mechanism including a pair of gripping fingers, means for opening and closing the gripping fingers during the continued rotation of the table, and means for swinging the gripping fingers laterally.

21. A revolvable mold table, a transfer mechanism mounted on the table independently of the molds and adapted to transfer formed ware, said transfer mechanism including a pair of grippers, means for closing the grippers to grasp the formed articles before the molds are opened, and means for transferring the articles after the molds have been opened.

22. A continuously revolving mold table, a transfer mechanism mounted on the table independently of the molds and adapted to transfer formed ware, said transfer mechanism including a pair of grippers, means for closing the grippers to grasp the formed articles before the molds are opened and during the continued rotation of the table, and means for transferring the articles after the molds have been opened.

23. A continuously revolving mold table, a transfer mechanism mounted on the table independently of the molds and adapted to transfer formed ware, said transfer mechanism including a pair of grippers adapted to swing toward and from the table, said swinging movement being effected by the rotation of the table, and means operated by the rotation of the table for opening and closing the grippers.

24. A continuously revolving mold table, a transfer mechanism mounted on the table independently of the molds and adapted to transfer formed ware, said transfer mechanism including a pair of grippers, means for closing said grippers to grasp the formed ware, the closing of said grippers effected by the rotation of the table.

25. A revolvable mold table, a transfer mechanism mounted on the table independently of the molds and adapted to transfer formed ware, said transfer mechanism including a pair of grippers, means for closing the grippers and lifting the formed article from a mold bottom, the closing of the grippers and the lifting of the article being effected by the rotation of the table.

26. A revolvable mold table, a transfer mechanism mounted on the table independently of the molds and adapted to transfer formed ware, said transfer mechanism including a pair of grippers for laterally transferring a formed article from the mold and table, the closing of the grippers and the lateral movement being effected by the rotation of the table.

27. A continuously revolving mold table, a transfer mechanism mounted on the table independently of the molds and adapted to transfer formed ware, said transfer mechanism including a pair of grippers for gripping the formed article, and means for laterally transferring the article, the closing of the grippers and the lateral transfer of the article being effected by the rotation of the table.

28. A revolvable mold table, a transfer mechanism mounted on the table independently of the molds and adapted to transfer formed ware, said transfer mechanism including a pair of grippers for gripping the formed article, means for opening and closing the grippers, means for lifting the article clear of the mold bottom, and means for laterally transferring the article, all of said means being operated through the rotation of the table.

29. A revolving mold table, a transfer mechanism mounted on the table independently of the molds and adapted to transfer formed ware, said transfer mechanism including a pair of grippers for gripping the formed article, means for laterally transferring the article, and means for opening the grippers to deposit the transferred article, all of said means being operated through the rotation of the table.

30. A revolving mold table, a transfer mechanism mounted on the table independently of the molds and adapted to transfer formed ware, said transfer mechanism including a pair of grippers for gripping the formed ware, means for lifting the article clear of the mold bottom, means for laterally transferring the article, means for lowering the grippers, and means for opening the grippers after they have been lowered.

31. A continuously revolving mold table, a transfer mechanism carried by the table independently of the molds and adapted to transfer formed ware, said transfer mechanism including a pair of grippers, a cam track, and an operative connection between the cam track and grippers to open and close the grippers as the table rotates.

32. A continuously revolving mold table, a transfer mechanism mounted on the table independently of the molds and adapted to transfer formed ware, said transfer mechanism including a pair of grippers, a cam track, an operative connection between the cam track and the grippers, to first close the grippers and then elevate them.

33. A continuously revolving mold table, a transfer mechanism mounted on the table independently of the molds and adapted to transfer formed ware, said transfer mechanism including a pair of grippers, cam tracks, means for opening and closing the grippers, and means operatively connected with the grippers and adapted to engage the cam tracks to swing the grippers back and forth at intervals during the rotation of the table.

34. A continuously revolving mold table, a transfer mechanism mounted on the table independently of the molds and adapted to transfer formed ware, said transfer mechanism including a pair of grippers, cam tracks, and an operative connection between the cam tracks and grippers, the cam tracks being constructed to close the grippers, swing them laterally and open them.

35. A continuously revolving mold table, a transfer mechanism mounted on the table independently of the molds and adapted to transfer formed ware, said transfer mechanism including a horizontally swinging arm, a pair of grippers carried by the swinging arm, a downwardly extending member operatively connected with the swinging arm, a laterally extending arm carried by the downwardly extending member, and a cam track adapted to be engaged by the laterally extending arm to swing the arm carrying the grippers in a horizontal plane.

36. A continuously revolving mold table, a transfer mechanism mounted on the table independently of the molds and adapted to transfer the formed articles, said transfer mechanism including a swinging bracket, a pair of grippers supported by the swinging bracket, means for opening and closing the grippers, means for swinging said bracket, and means for raising and lowering the bracket.

37. A continuously revolving mold table, a transfer mechanism mounted on the table independently of the molds and adapted to transfer formed ware, said transfer mechanism including a bearing member, a swinging bracket normally resting on said bearing member, a pair of grippers carried by the swinging bracket, means for opening and closing the grippers, means for swinging the bracket, and means for raising the bracket off the bearing member.

38. A continuously revolving mold table carrying a plurality of molds, a transfer mechanism for each mold mounted on the table independently of the molds and adapted to transfer formed ware, each of said transfer mechanisms including a pair of grippers, means for opening and closing the grippers, and means for swinging the grippers laterally, said grippers being opened and closed and swung laterally by the rotation of the table.

39. A continuously revolving mold table carrying a plurality of molds, a transfer mechanism for each mold mounted on the table independently of the molds and adapted to transfer formed ware, each of said transfer mechanisms including a pair of grippers for gripping the formed articles, means for moving the articles laterally, and means for depositing the articles and opening the grippers, all of said means being operated by the rotation of the table.

40. A continuously revolving mold table carrying a plurality of partible molds, a transfer mechanism for each mold mounted on the table independently of the molds and adapted to transfer formed ware, each of said transfer mechanisms including a pair of grippers, and means operating to close the grippers successively before the molds are opened.

DAVID STENHOUSE.